Jan. 6, 1942.   E. ORSHANSKY, JR   2,268,770
BEARING
Filed March 8, 1940   2 Sheets-Sheet 1
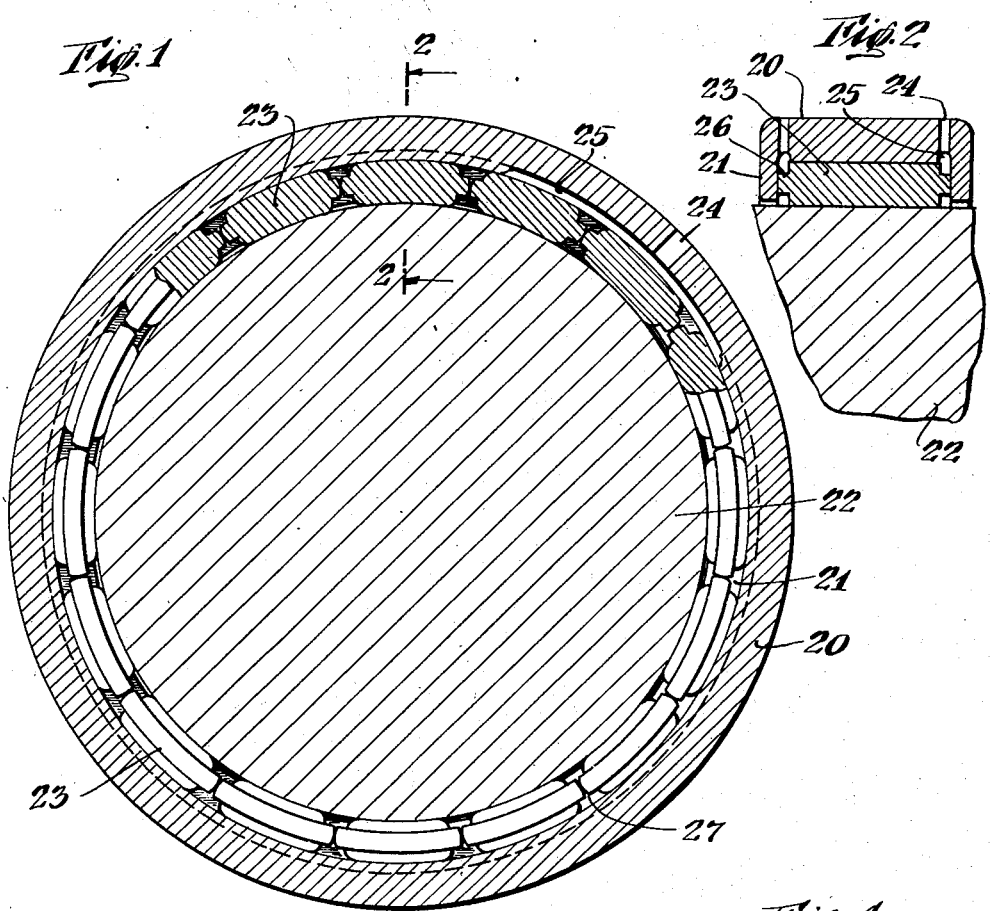
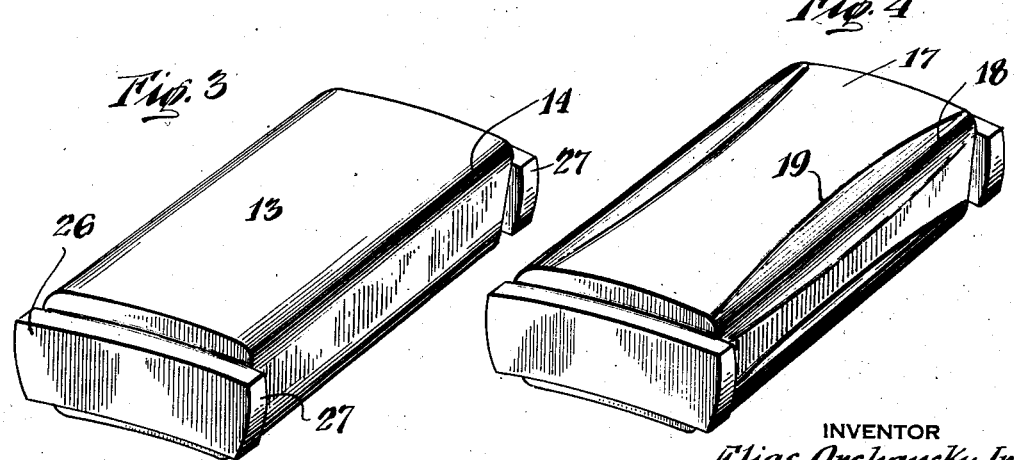
INVENTOR
*Elias Orshansky, Jr.*
BY
ATTORNEYS Jan. 6, 1942.   E. ORSHANSKY, JR   2,268,770
BEARING
Filed March 8, 1940   2 Sheets-Sheet 2
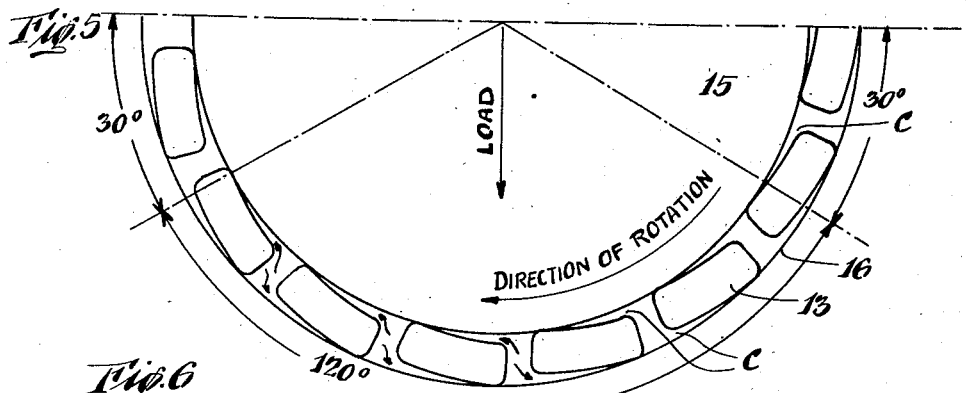
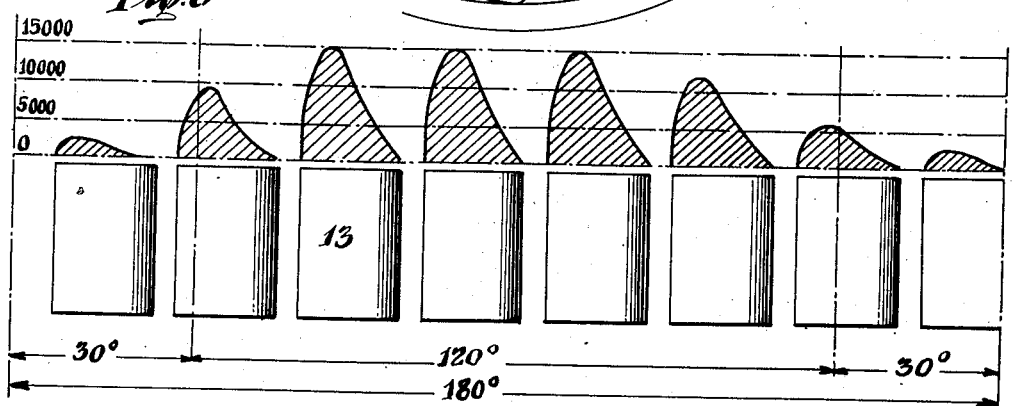
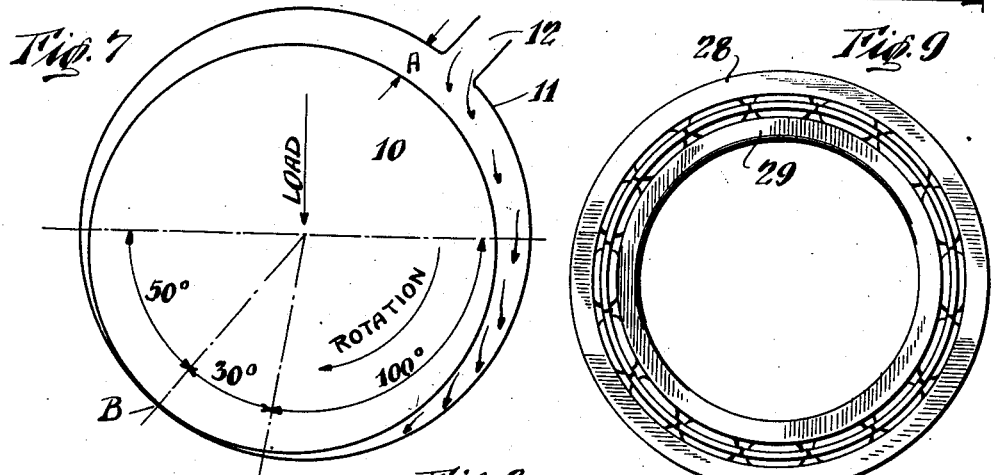
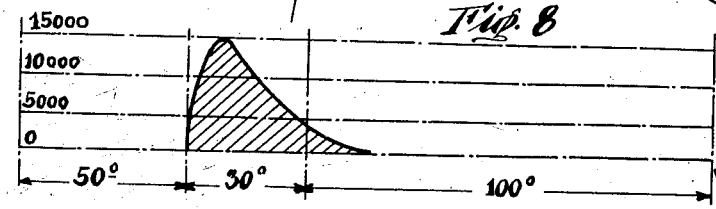
INVENTOR
Elias Orshansky, Jr.
BY
Dull, Kane and Smoot
ATTORNEYS Patented Jan. 6, 1942

2,268,770

UNITED STATES PATENT OFFICE 2,268,770

BEARING

Elias Orshansky, Jr., University Heights, Ohio, assignor to The Acrotorque Company, Cleveland, Ohio, a corporation of Connecticut Application March 8, 1940, Serial No. 322,869

5 Claims. (Cl. 308—73)

This invention relates to a structurally and functionally improved bearing, capable of use in numerous different associations, but primarily adapted to be employed where heavy loads are to be anti-frictionally supported.

It is well appreciated that under certain types of installations, ordinary bearings cannot be employed. For this reason, it has been proposed to employ a structure involving, for example, an annular series of non-rotating elements interposed between a shaft and a supporting member, and in order to adequately support the shaft.

In other installations, an attempt has been made to properly support the parts by simply enclosing one or more portions of the shaft in supporting portions. The latter usually where specially surfaced and similar treatment has, in certain instances, been accorded the shaft.

However, where loads of great value have been encountered, it has been found that neither one of these expedients has sufficed. More particularly, when certain pressures per units of area are exceeded, the oil film has been broken down so that a metal to metal contact has occurred. Under these circumstances, the bearing, or the elements of the same which have assumed the load, have become quickly worn and the unit has been of no further value.

Heretofore, any number of proposals have been made with a view to forcing the maintenance of an oil film between the moving parts. Most of these expedients, while well intentioned, have, if anything, assisted in the destruction of the necessary film. At best, they have not served to any appreciable extent to assure adequate lubrication.

Thus, it is an object of the invention to provide a bearing capable of use in connection with heavy loads, and which may support parts having relative movements at comparatively high speeds and without danger of the bearing rapidly wearing and being rendered useless.

The foregoing object is achieved by resorting to a structure such that the oil film at all times is maintained, and this oil film is constantly renewed and circulated past the surfaces with which it cooperates.

A further object of the invention is that of providing a unit of this character which will be relatively simple in construction and inexpensive in manufacture; the parts being capable of ready assemblage to furnish a unitary mechanism operating over long periods of time, with freedom from all difficulties.

With these and other objects in mind, reference is had to the attached sheets of drawings, illustrating practical embodiments of the invention, and in which:

Fig. 1 is a sectional view of a bearing;

Fig. 2 is an enlarged transverse sectional view thereof, taken along the line 2—2 and in the direction of the arrow as shown in Fig. 1;

Fig. 3 is a perspective view of one of the bearing elements;

Fig. 4 is a similar view of a slightly modified form of element;

Fig. 5 is a diagrammatic representation of a portion of the bearing and illustrating, in somewhat exaggerated fashion, the operation of the same;

Fig. 6 is a view approximating the load factors and showing the bearing surfaces which are active under conditions such as those shown in Fig. 5;

Fig. 7 is a diagrammatic view illustrating the action which occurs in bearings, as heretofore constructed;

Fig. 8 is a diagram of the load and bearing factor as occurring in Fig. 7; and

Fig. 9 is a view similar to Fig. 1, but showing a slightly different form of construction.

As afore brought out, in bearings, as heretofore constructed, rapid wear and unsatisfactory operation occurs where high load factors are present. This is to be attributed to the pressure which causes a rupture of the oil film at the points of minimum clearance, with consequent metal to metal contact and destructive friction.

This effect has been illustrated diagrammatically in Figs. 7 and 8, in which it has been assumed that the numeral 10 indicates a shaft rotating within an enclosure 11, as indicated by the arrow. Under these circumstances, the load is to be assumed as acting in the direction indicated by the correspondingly identified arrow, with the result that the area of maximum pressures ordinarily occurs throughout the 30° arc, as also identified in this figure.

It is to be understood that the relative eccentricity and clearance of the parts has in this view been greatly exaggerated for the purpose of illustration. Likewise, an oil channel or duct 12 has been illustrated in a diagrammatic manner. Returning to the question of clearances, these may actually, at point A be in the neighborhood of .004 to .006 inch, and at point B substantially zero.

Regardless of the structure and value of the clearances, the oil will enter through channel 12, or in any other desired manner, and flow between the shaft and enclosure 11. Thus, a material layer or film of oil will exist between the relatively movable parts, but at a point substantially midway between points A and B, or slightly in advance of such midway point, the shaft will, in conjunction with its enclosing member 11, begin to function as a pump, and will expel to the sides of the enclosing member the film of oil. This expulsion will continue until finally the 30° critical zone—as shown in Fig. 8—is reached. At this point, the pressure increases at a great rate. Under such circumstances, it is found that the oil film ruptures with consequent damage, as afore outlined. Beyond point B, the shaft and enclosing member again function somewhat in the order of a rotor and stator to create a suction drawing a body of oil between these elements.

For the sake of emphasis, it is desired, at this time, to again reiterate that under ordinary circumstances, the clearance between the shaft and enclosing member is of a value from, for example, .004 to .006". In other words, the functions afore noted, while very noticeable in their results, partake of microscopic relative movements of the parts; such parts in the drawings having, for the purposes of illustration, been greatly exaggerated, with respect to their clearances, in order that the effects might be visualized.

Also, it will be understood that instead of there being merely involved a shaft and enclosing member, as illustrated, it is customary to actually interpose between these members a series of slipper elements. Such a provision, however, in no respects alters the fundamental problem, in that merely instead of the breakdown or rupture of oil film occurring between the enclosing element and shaft, such breakdown in oil film pressure occurs between the slipper elements and enclosing member on the one hand, and between the slipper elements and shaft on the other.

Even where slipper elements have heretofore been employed, in conjunction with various types of oil grooves, or channels, no improvement has resulted. In fact, due to the edges of the channels and grooves, it frequently occurs that scraping edges or surfaces are presented, which appear to rupture the oil film at an earlier stage than such rupture or breakdown would have occurred had no grooves or channels been present.

I have discovered if a structure is embodied such, that the tendency of an oil film to form is promoted, then a load may safely be imposed upon a shaft without fear of the oil film being ruptured. More especially, it has been found considering, for example, a series of slipper elements, if the latter have their leading edges so formed as to promote what might be termed a "planing" effect, that an oil film will be created and maintained between these elements and adjacent surfaces, and even where loads of high value exist.

Thus, referring to Figs. 3 and 5, a series of slipper elements are shown which have body portions 13 formed, for example, of bronze, alloys or steel, etc. The edges of these elements are rounded, as has been indicated at 14. This rounding, or bevelling may, for example, be on a $\frac{1}{16}$" radius. With a slipper having a length of $\frac{5}{8}$ of an inch, it is found that this will result in a clearance at the leading edges of less than .0005" between the shaft 15 and the enclosing member 16. Such points of clearance have, of course, been exaggerated to a marked extent, and indicated by the reference letter C. In other words, with the shaft rotating in the direction indicated by the arrow in Fig. 5, the slipper elements are caused to "plane" over the film of oil, which has the effect of causing such film to be definitely maintained, even at the zone of maximum pressure. Otherwise stated, it might be said that the slipper elements assume a microscopically tilted or "cocked" position, and this occurs at both of the leading edges of each of the elements. As far as I have been able to discover, it is not necessary that the trailing or rear edges of the elements be given a similar bevelling, but I prefer that such procedure be nevertheless followed, with respect to all four edges. By this expedient in assembling the bearing, an operator will not have to exercise undue caution in arranging the slipper elements, and—more important—the shaft and enclosure may be rotated in either direction with respect to each other.

Now referring to Fig. 6 in which the bearing elements; active throughout the "load" angle (approximately 120°) are illustrated, it will be observed that those elements which are at the beginning and rear end of this zone create an oil film pressure which is of relatively low value. However, this pressure increases with each succeeding element, but in no event is the film ruptured or destroyed.

Under certain circumstances, it might be desirable to employ a slipper element such as has been shown in Fig. 4, in which the body 17, in addition to presenting a bevelled edge 18, has its body microscopically reduced, as at 19, so that the leading edge is also somewhat concave. Thus, a scoop effect is achieved which, under certain instances, may even enhance the results obtained by the element such as that illustrated in Fig. 3. Regardless of the type of element employed, however, it is preferred to assemble the slipper elements somewhat in the fashion shown in Figs. 1 and 2, in which the enclosure member 20 may be in the form of a channel member having inwardly extending side walls 21. If the shaft 22 has, for example, a two inch diameter, the side walls 21 should be developed on a radius such that they will have a .002" diametral clearance with respect to the shaft. The width of the slipper elements 23 will, in so far as their body portions are concerned, be less than the distance between the walls 21. At the point of juncture of these walls with the outer portion of member 20, grooves 25 may be formed for the retention and collection of oil. Communicating with these grooves are passages 24 so that oil may freely circulate.

Now, in order to permit assembly of and retention within member 20 of the bearing elements 23, the latter are formed with flange portions 26 extending from their side faces and having a length in excess of that of the element with which they are associated. Thus, these flange portions extend in advance and to the rear of the leading and trailing edges of the elements, as has been indicated at 27. The end edges of flanges on adjacent elements contact at these points, and are preferably rounded.

As will be understood, the aggregate length of the flange members 26 is such that a series of the elements 23 will be properly supported and retained within the member 20, even although the forward and rear edges of the main bodies of such elements are spaced from each other. Also, as will be seen in Fig. 2, the width of the elements, in addition to the width of the flanges 26, will substantially fill the space existing within the inner faces of walls 21.

Of course, in no instance must the clearances be so close that a binding effect will occur. In any event, by this construction, it is feasible to assemble a series of elements within the retaining or enclosing member 20, and to freely transport and apply the latter without danger of the elements becoming displaced. Also, when operative, there will be no interference with the elements tilting in a manner such that they "plane" over the film of oil and so that they may be freely movable with respect to each other.

With elements of the size, such as afore indicated, it is preferred that the distance from the upper and lower surfaces of the flanges 26 to the corresponding surfaces of the elements be approximately $\frac{1}{16}''$. Moreover, it has been found desirable that under these circumstances the upper surface of the elements be developed along a $2\frac{1}{4}''$ radius, while the inner surfaces of the elements may be developed along a $2\frac{1}{16}''$ radius. While these figures are all approximate, and may be varied in numerous respects, it is to be understood in addition to the bevelled edges which are present, that the desired effect is achieved by, in substance, forming the elements to have their inner and outer faces curved to correspond to arcs such that the "planing" effect is, in each instance, achieved. This "planing" effect results even under loads of low value, but it is, of course, of special consequence where more severe loads are in contemplation.

Finally, it will be appreciated that a bearing, embodying the present invention, may be constructed along numerous different lines. In this connection, attention is invited to Fig. 9 which is a somewhat diagrammatic representation. In this view, the numeral 28 indicates an enclosing member corresponding to the member 20, and the numeral 29, a ring shaped element, which is in turn to be fitted to the shaft or other rotatable element. An assemblage of this nature might, of course, be multiplied to include any number of concentric and interposed units. In order to avoid unnecessary illustration, showings of the same have not been included.

In any event, it will be understood that as a result of the foregoing structures, the desired results are achieved, and among others, the several objects of the invention, as specifically afore noted, are susceptible to accomplishment.

Obviously, numerous changes in construction and rearrangements of the parts might be resorted to without departing from the spirit of the invention as defined by the claims.

Having described my invention, what I now claim is:

1. A bearing including an annular member, an annular series of elements associated with and to bear against said member, each of said elements being of arcuate configuration and to have their inner faces enclose and contact a second annular member, means whereby, under rotation of said members, said elements are caused to assume positions at tangents to the surfaces of at least one of said members and projecting portions extending from the sides and forming a part of each of said elements and also extending beyond the front and rear edges of the same to engage corresponding portions on adjacent elements.

2. A bearing including in combination a ring shaped member to enclose a series of bearing elements, a series of bearing elements disposed within and in association with and contacting said member and the forward edges of said elements being bevelled and having a concave curvature, such that said elements have a "scoop" effect while moving over and in contact with said ring shaped member.

3. A bearing slipper comprising a body having side portions and rounded leading and trailing edges, a flange portion adjacent said side edges, said flange having a width less than that of said body portion and a length greater than said body portion such that said flange portion extends beyond the leading and trailing edges of said body portion.

4. As an article of manufacture, a bearing element comprising a body having bevelled front and rear edges, flange portions formed on the sides of said body, said flange portions having a width less than that of the body portion and a length greater than that of said body, said flange formed with curved end portions.

5. A bearing including an annular channel member having inwardly extending side walls, an annular series of slipper elements associated with and adapted to have their outer faces bear against said channel member, each of said slippers being of arcuate configuration and arranged to have their inner faces contact a second annular member, said slippers being formed with body portions having bevelled leading and trailing edges and side portions comprising flange members of less width than said body portion, said flanges being of greater length than said body so that they project beyond the leading and trailing edges thereof, the ends of said flanges being rounded whereby the sides of said flanges engage the inwardly extending channel side walls and the ends of said flanges ride in face to face contact with adjacent flanges.

ELIAS ORSHANSKY, JR.